United States Patent [19]

Boutevin et al.

[11] Patent Number: 5,420,209

[45] Date of Patent: May 30, 1995

[54] PREPARATION OF (METH) ACRYLIC/GLUTARIMIDE COPOLYMERS

[75] Inventors: Bernard Boutevin; Jean-Pierre Parisi; Richard Legay; Bachar Hamoui, all of Montpellier; Stephane Nowe; Philippe Heim, both of Pau; Patrice Gaillard, Souchez, all of France

[73] Assignee: Elf Atochem S.A., Puteaux, France

[21] Appl. No.: 130,127

[22] Filed: Oct. 4, 1993

[30] Foreign Application Priority Data

Oct. 2, 1992 [FR] France .................. 92 11689

[51] Int. Cl.$^6$ ................................ C08F 8/32
[52] U.S. Cl. .................. 525/379; 525/329.9; 528/481; 528/492; 528/503
[58] Field of Search ............... 525/379; 528/481, 492, 528/503

[56] References Cited

U.S. PATENT DOCUMENTS 3,284,425 11/1966 Schroder et al. .
4,169,924 10/1979 Barbas et al. .
4,816,524 3/1989 Anzai et al. .................. 525/379
5,159,058 10/1992 Jerman et al. ............... 525/379

FOREIGN PATENT DOCUMENTS 0200530 1/1987 European Pat. Off. .
2393818 1/1979 France .

OTHER PUBLICATIONS

Chemical Abstract No. 60149s, vol. 113, No. 8, Otani et al., p. 22, "Heat–Resistant Copolymers Containing Six-–Membered Acid Anhydride And Imide Units".
Japanese Abstract No. A–61,043,604, "Modified Copolymer".

Primary Examiner—Bernard Lipman
Attorney, Agent, or Firm—Burns, Doane, Swecker & Mathis

[57] ABSTRACT (Meth)acrylic/glutarimide copolymers, well suited, e.g., for optical applications, having enhanced glass transition temperatures (Tg), are prepared by salifying the acid functions of (meth)acrylic ester/(meth)acrylic acid copolymers, and then imidifying such "intermediate" salified copolymers into the subject (meth)acrylic/-glutarimide polymers.

16 Claims, No Drawings

PREPARATION OF (METH) ACRYLIC/GLUTARIMIDE COPOLYMERS

BACKGROUND OF THE INVENTION

1. Field of the Invention

The present invention relates to a novel process for the preparation of unique (meth)acrylic/glutarimide copolymers, as well as to intermediate polymers useful in such preparation.

2. Description of the Prior Art (Meth)acrylic resins possess numerous useful properties, such as transparency, resistance to the environment, in particular to solvents, abrasion resistance, rigidity, good mechanical properties, and the like. These properties render them well suited for use in the optical fields, as materials for high performance optical circuits, optical communication over short distances and optical sensors, and in the fields of utility components, as automotive components, decorative components, components of electrical household appliances, and the like. Unfortunately, these polymers have a heat distortion temperature which is low and which restricts their uses.

Accordingly, a wide variety of processes have been proposed to this art which are intended to raise the glass transition temperature Tg, including that process which comprises introducing imide groups into the (meth)acrylic (co)polymer.

U.S. Pat. No. 2,146,209 describes an imidification process in which a (meth)acrylic acid polymer or an ester thereof is reacted with a primary amine in the presence or absence of a solvent at a temperature ranging from 140° to 200° C.

EP-A-0,200,530 describes and claims a process which comprises two stages. The first stage comprises the polymerization of methacrylic acid and/or methyl methacrylate; the second stage comprises the addition of ammonia or of a primary amine to the reaction mixture, maintained at a high temperature (150°–300° C.), to provide a glutarimide polymer.

Indeed, in all of the prior art processes the amine reagent is incorporated during the modification reaction. The degree of salification of the intermediate products is poorly controlled and, thus, the final products do not always exhibit constant properties. Furthermore, it is difficult to modify the working conditions of such processes in order to target both the constitution of the desired final polymers and their glass transition temperature Tg.

SUMMARY OF THE INVENTION

Accordingly, a major object of the present invention is the provision of an improved process for the production of (meth)acrylimide copolymers having variable and controlled glutarimide contents and possessing defined glass transition temperatures.

Briefly, the present invention features the salification of the acid functions of (meth)acrylic ester/(meth)acrylic acid copolymers, at a temperature close to ambient temperature, by primary (cyclo)aliphatic or aromatic amines, after which the "intermediate" copolymers are heated at a high temperature under pressure to convert same into the subject (meth)acrylic/glutarimide polymers.

DETAILED DESCRIPTION OF PREFERRED EMBODIMENTS OF THE INVENTION

More particularly according to the present invention, contrary to the conventional processes in which the amine reagent is incorporated during the modification reaction, consistent herewith the amine is already fixed by an ionic bond to the carbon skeleton of the polymer which is to be modified. This makes it possible to easily control the degree of salification and, hence, the proportion of final glutarimide groups, based on the acid content of the starting copolymer.

Thus, the present invention provides a novel process for the preparation of (meth)acrylic/glutarimide copolymers of formula I:

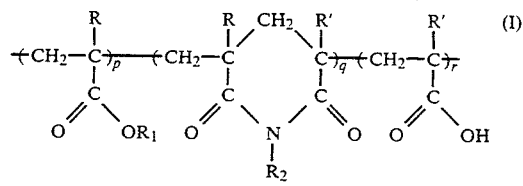

in which R and R' which may be identical or different, are each H or $CH_3$; $R_1$ is a $C_{1-8}$ alkyl radical; $R_2$ is H, a $C_{1-12}$ alkyl radical, a $C_{6-14}$ cycloalkyl radical or a $C_{6-12}$ aryl radical; and p, g and r are numbers such that $1 \leq p \leq 99$, $1 \leq g \leq 99$ and $0 \leq r \leq 30$, with $p+g+r=100$, comprising the stages of:

(a) polymerizing monomers of the respective formulae:

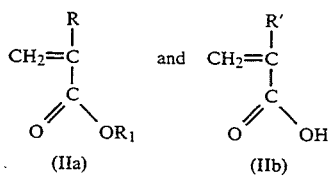

to produce a polymer of formula III:

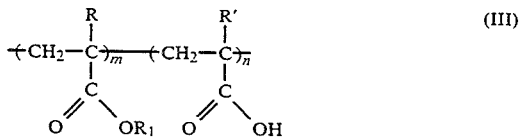

in which R, R' and $R_1$ are as defined above and $m+n=1$ and $1/99 \leq m/n \leq 99$, at a temperature of from 30° to 140° C., for a period of time of from 1 to 20 hours, until the polymerization has attained a degree of at least 90%.

(b) salifying the polymer III thus obtained with at least a stoichiometric amount of a primary amine of the formula:

in which $R_2$ is as defined above to provide a salified polymer of formula IV:

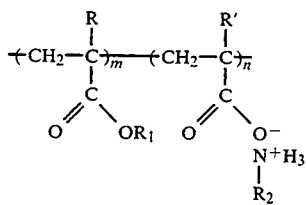

in which the various symbols are as defined above, at a temperature of from 0° to 40° C., for a period of time of 1 minute to 1 hour, and (c) imidifying the salified polymer IV thus obtained to produce the polymer of the aforementioned formula I, at a temperature of from 150° to 350° C., for a period of time of 1 minute to 5 hours, under a pressure of from 1 to 100 atmospheres.

Accordingly, the first stage entails introducing, into a suitable reactor, a mixture of monomers comprising 1% to 99 mol % of (meth) acrylic acid and 99% to 1 mol % of (meth)acrylic esters, and thereafter polymerizing same to a degree of polymerization of at least 90%.

The (meth)acrylic ester starting monomers are the alkyl esters of (meth)acrylic acid in which the alkyl moiety has from 1 to 8 carbon atoms and preferably from 1 to 4 carbon atoms. Exemplary such esters include methyl (meth)acrylate, ethyl (meth)acrylate, n-propyl and isopropyl (meth)acrylates and n-butyl, sec-butyl and tert-butyl (meth)acrylates.

The (meth)acrylic copolymers can include other co-monomers which contain a single site of ethylenic unsaturation. Examples of such monomers are styrene, α-methylstyrene, (meth)acrylonitrile and (meth)acrylamides. Comonomers containing two sites of ethylenic unsaturation, such as butadiene, are also suitable. However, these latter monomers must not exceed a proportion of 50% by weight, preferably 20% by weight, in the synthesized copolymer.

The polymerization is carried out under the reaction conditions set out above. Preferably, the polymerization is carried out under atmospheric pressure. Preferably, the temperature ranges from 30° to 70° C. and the reaction time ranges from 1 to 10 hours. Preferably, the m/n ratio in stage (a) is such that $\frac{1}{2} \leq m/n \leq 5$.

In one embodiment of the invention, stage (a) is carried out in the presence of a radical polymerization initiator and, optionally, in the presence of a chain terminator.

The radical initiators are those which are typically used in radical polymerizations of acrylic monomers and which decompose when heated, such as peroxides, azo compounds, percarbonates and the like.

Exemplary such organic peroxide compounds include tert-butyl peroxide, cumyl peroxide, methyl ethyl ketone peroxide, tert-butyl perphthalate, tert-butyl perbenzoate, tert-butyl peracetate, 2,5-dimethyl-2,5-di(tert-butylperoxy)hexane, tert-amyl peroxide, benzoyl peroxide, lauryl peroxide and tert-butyl perpivalate.

Exemplary such organic azo compounds include azo-bis-isobutanol acetate, 1,1-azo-bis-cyclohexanecarbonitrile, 2-phenylazo-2,4-dimethyl-4-methoxyvaleronitrile, 2-cyano-2-propylazoformamide and 2,2-azo-bis-isobutyronitrile.

And an exemplary percarbonate compound is tert-butyl percarbonate.

These initiators can be used separately or in admixture of two or more thereof. The selection is made depending upon the polymerization temperature.

The chain terminators conventionally employed are primary, secondary or tertiary mercaptans which contain a linear or branched, unsubstituted or substituted, alkyl radical. Exemplary such mercaptans include n-butylthiol, sec-butylthiol, tert-butylthiol, n-dodecylthiol and n-octylthiol. Mercaptans which also contain an aromatic moiety are also suitable, such as benzenethiol, thiocresol and 4-tert-butyl-o-thiocresol. Other mercaptans are also suitable, such as thioglycolic acid and esters thereof, for example those having from 2 to 18 carbon atoms in the alkyl chain, such as ethylene thioglycol.

These agents may be used separately or as a mixture of two or more thereof. The amounts of mercaptan introduced depend on the desired molecular weight as well as on the reaction temperature.

In another embodiment of the invention, the polymerization is carried out in solution: stage (a) is carried out in the presence of a solvent. The solvent is any suitable solvent and varies according to the acid content, i.e., the fraction of acid monomer, which it is desired to incorporate into the copolymer. The mixture of the monomers preferably constitutes from 10% to 50% of the total weight of the reaction mixture.

The solvent is selected from among the solvents of high polarity, such as acetone, methanol, acetonitrile, dioxane, tetrahydrofuran, acetamide, dimethylformamide, and the like. A mixture of solvents may also be used.

In yet another embodiment of the invention, the polymerization is carried out in a precipitating medium. Stage (a) is carried out in the presence of a solvent in which the monomer mixture is soluble but the polymer is not. The polymer precipitates in the form of granules during the polymerization. In this event, the solvent or the mixture of solvents is selected from among the solvents of low polarity, such as hexane, toluene and the like.

In the second stage, namely, stage (b), the process entails adding a primary amine at a temperature close to ambient temperature directly to the polymerization reaction mixture under the conditions, indicated above, which permit production of the salified polymer.

Preferably, the salification is carried out under atmospheric pressure. Also preferably, it is carried out at a temperature of from 10° to 30° C. for a period of time of from 15 to 30 minutes.

The amine added is present in an at least a stoichiometric amount, i.e., the amine is in excess. Preferably, the molar ratio of primary amine/acid groups of the polymer in stage (b) ranges from 1 to 4.

The amine added has the following general formula:

in which $R_2$ is a hydrogen atom, an aliphatic radical having from 1 to 12 carbon atoms, a cycloaliphatic radical having from 6 to 14 carbon atoms or an aryl radical having from 6 to 12 carbon atoms. Such radicals can also be substituted by conventional substituents.

Particularly preferred amines are methylamine and cyclohexylamine.

The amine is added pure or diluted in a polar solvent which is miscible with the polymerization solvent. According to one embodiment, stage (b) is carried out in the presence of a solvent.

The salified copolymer obtained at the end of this stage can be purified via conventional techniques such as evaporation under reduced pressure at a temperature of from 20° to 60° C., preferably from 30° to 50° C., or such as precipitation of the salified copolymer in a nonsolvent, and filtering off the copolymer.

The salified copolymer corresponds to the general formula IV.

The third stage of the process of preparation of the imidified polymer may be carried out by introducing the salified copolymer of formula IV into a reactor which advantageously is leakproof and is equipped with a stirrer system, and heating the undiluted copolymer at a temperature of from 150° to 350° C., preferably from 150° to 300° C., under a pressure of from 1 to 100 atmospheres, preferably from 1 to 10 atmospheres, for a residence time which ranges from 1 minute to 5 hours, preferably from 5 minutes to 5 hours.

This stage can be carried out without a solvent, or in the presence of a solvent.

In still another embodiment of the invention, the third stage can be carried out in an extruder or a static mixer.

In another embodiment of the invention, the stages (a), (b) and (c) are carried out in a solvent medium. When the imidification reaction is indeed carried out in solution in a solvent, the solvent is stable at high temperatures. Exemplary such solvents include benzene, toluene, xylene and other BTX, cyclohexanol, and the like, used either alone or in admixture. In this instance, the imidification reaction must be followed by a supplementary step of devolatilization under reduced pressure, to remove the solvent and the reaction by-products.

In yet another embodiment of the invention, the stages (a) and (b) are carried out in a solvent and the solvent is evaporated prior to stage (c), i.e., prior to the imidification stage.

The process according to the present invention provides for the preparation of glutarimide copolymers having improved heat resistance and exhibiting a high Tg which is easy to control.

These copolymers may still contain residual acid groups or possibly anhydride groups, in amounts of from 1 to 2 milliequivalents/g, such amounts varying according to the degree of imidification. These functional groups are formed via the normal recombination reaction of the amines along the polymer chain. It is preferable to remove these functional groups.

Accordingly, in another embodiment of this invention, the subject process comprises the following supplementary stage (d):

(d) esterification of the residual acid or anhydride groups present in the polymer obtained upon completion of stage (c), to provide a glutarimide polymer of formula V:

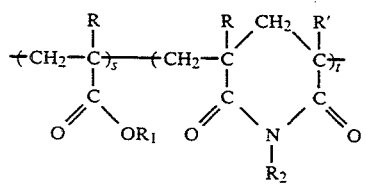

in which R, R' R and $R_2$ are as defined above and s and t are numbers such that $s+t=1$ and $0.01 \leq s \leq 0.99$ and $0.01 \leq t \leq 0.99$, at a temperature of from 50° to 350° C., for a period of time of from 5 minutes to 5 hours, under a pressure of from 1 to 40 atmospheres, in the presence of an esterification agent, the latter being present in a molar ratio of esterification agent/residual functional groups ranging from 1 to 4.

Preferably, this stage (d) is carried out at a temperature of from 150° to 300° C. for a period of time of from 15 minutes to 3 hours under a pressure of from 1 to 20 atmospheres and employing a molar ratio of reactants of from 1 to 2.

The esterification agents which can be used are conventional to this art. Exemplary thereof are the orthoesters, the ketals, the carbonates the sulfoxides, the sulfates, the isocyanates, and others. An orthoester is particularly advantageous.

The esterification reaction can be catalyzed by, for example, tertiary amines, ammonium salts or Lewis acids.

There are thus prepared (meth)acrylic ester glutarimide copolymers having good heat resistance, with Tg values in general above 120° C. and varying according to the nature of the amine and the degree of salification of the starting copolymer. These polymers are uncrosslinked and have good transparency.

The present invention also features the intermediate polymers which are used in the subject synthesis. These intermediate polymers are the salified copolymers of formula IV:

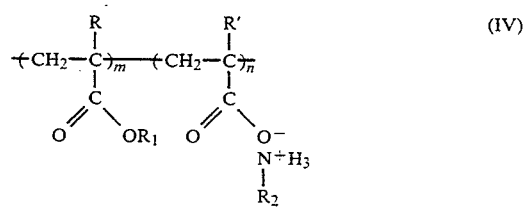

in which R and R', which may be identical or different, are each H or $CH_3$, $R_1$ is a $C_1$–$C_8$ alkyl radical, $R_2$ is H, a $C_1$–$C_{12}$ alkyl radical, a $C_6$–$C_{14}$ cycloalkyl radical or a $C_6$–$C_{12}$ aryl radical and m and n are numbers such that $m+n=1$ and $1/99 \leq m/n \leq 99$.

A preferred polymer is the polymer of formula VI:

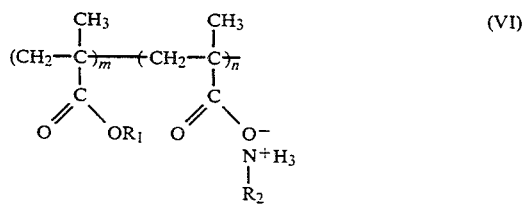

in which:

$R_1 = CH_3$, $C_2H_5$, $-(CH_2)_2-CH_3$, $-CH(CH_3)_2$, $-(CH_2)_3-CH_3$, $-\underset{CH_3}{\underset{|}{CH}}-CH_2-CH_3$ or $-\underset{CH_3}{\underset{|}{\overset{CH_3}{\overset{|}{C}}}}-CH_3$; and $R_2 = H$, $CH_3$, $C_2H_5$ or cyclo $C_6H_{14}$;

and m and n being the respective molar proportions of (meth)acrylic ester and of ammonium salt of (meth)acrylic acid, with $m+n=1$ and $\frac{1}{5} \leq m/n \leq 5$.

Preferably, m and n are such that $\frac{1}{2} \leq m/n \leq 5$. Furthermore, certain substituents are also preferred. Thus, particularly preferred are the salified polymers in which R and R' of formula IV are both CH$_3$ and R$_1$ is a methyl group.

The amine is preferably such that one of the specific examples below is obtained; R$_2$ is a methyl group or R$_2$ is a cyclohexyl group.

The weight-average molecular weight of this polymer ranges from 10,000 to 300,000, preferably from 20,000 to 150,000.

In order to further illustrate the present invention and the advantages thereof, the following specific examples are given, it being understood that same are intended only as illustrative and in nowise limitative.

In said examples to follow, "MMA" and "MAA" respectively designate "methyl methacrylate" and "methacrylic acid."

EXAMPLE 1

The batch radical copolymerization of 18 g of methyl methacrylate (MMA) (0.18 mol) and of 1.72 g of methacrylic acid (MAA) ($2 \times 10^{-2}$ mol) in 100 ml of acetone was carried out in a three-necked glass flask equipped with a condenser and a nitrogen inlet, in 100 ml of refluxing acetone (T=56° C.) for 8 hours, under nitrogen, in the presence of a mixture of initiators, i.e., $10^{-3}$ mol of 2,2'-azo-bis-isobutyronitrile (AIBN) and $10^{-3}$ mol of tert-butyl perpivalate. After complete polymerization, the mixture was cooled to ambient temperature. Thereafter, 4.65 g of a 40% strength aqueous solution of methylamine ($6 \times 10^{-2}$ mol), previously cooled to 0° C., were added dropwise directly to the polymerization mixture. The addition required 15 minutes and the mixture was permitted to react for an additional 15 minutes. The solvents, namely, acetone and water, were evaporated on a rotary evaporator with heating to 50° C. The copolymer was then dried at 50° C. for 10 hours in a ventilated oven.

The salified copolymer was heated in mass in a glass reactor under pressure, placed in an autoclave which was itself agitated by a rocker system, at 250° C. for 3 hours.

The product was taken up in acetone and precipitated in ether. It was filtered off and dried in a ventilated oven at 50° C.

For the final esterification treatment, the imidified polymer was placed in the reactor described above in the presence of xylene and trimethyl orthoformate (TMOF) under stoichiometric conditions, namely, [TMOF]/[residual MAA]=2.

The reaction mixture was heated at 250° C. for 3 hours. After cooling, the polymer was precipitated and dried in a ventilated oven. A completely transparent product was obtained.

The chemical composition and heat resistance of the polymer before and after treatment with trimethyl orthoformate are reported in the Table which follows:

The chemical composition results for the various polymers were determined by microanalysis (% N), colorimetric determination of the acid and anhydride groups, and $^1$H NMR at 250 MHz (carried out using a BRUKER WP 250 apparatus).

The Tg values were determined by differential thermoanalysis using a PERKIN-ELMER DSC 4 apparatus.

EXAMPLE 2

A polymer comprising recurring glutarimide structural units was prepared under the same conditions as in Example 1, except that the starting material was an initial monomer mixture of 16 g of MMA (0.16 mol) and 3.44 g of MAA (0.04 mol).

During the salification stage, 9.30 g of a 40% strength aqueous methylamine solutio ($1.2 \times 10^{-1}$ mol) were added dropwise. The imidification results are reported in the following Table. A completely transparent polymer was obtained.

EXAMPLE 3

The procedure of Example 1 was repeated, and 14 g of MMA (0.14 mol) and 5.16 g of MAA (0.06 mol) were batch copolymerized, but in this instance in refluxing methanol (T=65° C.) in the presence of a mixture of initiators, i.e., $1.5 \times 10^{31\,3}$ mol of AIBN and $5 \times 10^{-4}$ mol of tert-butyl perpivalate.

The salification after polymerization was carried out using 13.95 g of a 40% strength aqueous methylamine solution (0.18 mol). Thereafter, the procedure of Example 1 was repeated. A completely transparent polymer was obtained.

EXAMPLE 4

The procedure of Example 3 was repeated, and 12 g of MMA (0.12 mol) and 6.88 g of MAA (0.08 mol) were batch copolymerized in refluxing methanol for 8 hours.

The salification after polymerization was carried out using 18.6 g of a 40% strength aqueous methylamine solution (0.24 mol). Thereafter, the procedure of Example 1 was repeated. The polymer obtained was completely transparent.

EXAMPLE 5

The procedure of Example 3 was repeated, and 10 g of MMA (0.1 mol) and 8.6 g of MAA (0.1 mol) were batch copolymerized in refluxing methanol for 8 hours.

The salification after polymerization was carried out using 23.25 g of a 40% strength aqueous methylamine solution (0.3 mol). Thereafter, the procedure of Example 1 was repeated. The polymer obtained was completely transparent.

TABLE

Results of analyses of chemical composition and heat resistance after pyrolysis and after esterification of residual acid groups with trimethyl orthoformate (TMOF):

| EXAMPLES | INITIAL MONOMER COMPOSITION (Moles) | | AFTER PYROLYSIS | | | | | AFTER AN ESTERIFICATION TREATMENT WITH TRIMETHYL ORTHOFORMATE | | | | |
|---|---|---|---|---|---|---|---|---|---|---|---|---|
| | MMA | MAA | % N | % acid (milliequivalent/g) | Composition (mol) MMA | IMIDE | MAA | Tg (°C.) | % N | Composition (mol) MMA | IMIDE | MAA | Tg (°C.) |
| 1 | 90 | 10 | 1.62 | 1.76 | 77 | 11 | 12 | 199.5 | 1.43 | 89 | 11 | 0 | 124 |
| 2 | 80 | 20 | 3.77 | 1.73 | 54 | 26 | 20 | 162 | 3.55 | 74 | 26 | 0 | 132 |
| 3 | 70 | 30 | 4.37 | 1.73 | 43 | 36 | 21 | 154 | 4.28 | 64 | 36 | 0 | 132 |
| 4 | 60 | 40 | 5.49 | 1.78 | 10 | 47 | 23 | 162 | 5.28 | 63 | 47 | 0 | 139 |

TABLE-continued

| 5 | 60 | 50 | 6.74 | 1.20 | 17 | 66 | 17 | 165.5 | 6.73 | 34 | 66 | 0 | 150 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of a (meth)acrylic/-glutarimide copolymer having the formula (I):

$$-(CH_2-C_R)_p-(CH_2-C_R\overset{CH_2}{\underset{C}{|}}C_{R'})_g-(CH_2-C_{R'})_r- \quad (I)$$

with substituents $C(=O)OR_1$, $C(=O)-N(R_2)-C(=O)$, $C(=O)OH$ in which R and R', which may be identical or different, are each H or $CH_3$; $R_1$ is a $C_{1-8}$ alkyl radical; $R_2$ is H, a $C_{1-12}$ alkyl radical, a $C_{6-14}$ cycloalkyl radical, or a $C_{6-12}$ aryl radical; and p, g and r are numbers such that $1 \leq p \leq 99$, $1 \leq g \leq 99$ and $0 \leq r \leq 30$, with $p+g+r=100$, comprising imidifying a previously salified copolymer having the formula (IV):

$$-(CH_2-C_R)_m-(CH_2-C_{R'})_n- \quad (IV)$$

with $C(=O)OR_1$ and $C(=O)O^- N^+H_3 R_2$ in which m and n are numbers such that $m+n=1$ and $1/99 \leq m/n \leq 99$.

2. A process for the preparation of a (meth)acrylic/-glutarimide copolymer of formula (I) as defined in claim 1, comprising sequentially, (a) polymerizing monomers of the respective formulae (IIa) and (IIb):

$$CH_2=C_R-C(=O)OR_1 \quad \text{and} \quad CH_2=C_{R'}-C(=O)OH$$

(IIa) (IIb)

to provide a polymer having the formula III:

$$-(CH_2-C_R)_m-(CH_2-C_{R'})_n- \quad (III)$$

with $C(=O)OR_1$ and $C(=O)OH$ in which m and n are numbers such that $m+n=1$ and $1/99 \leq m/n \leq 99$, (b) next salifying said polymer (III) with an at least stoichiometric amount of a primary amine having the formula $R_2-NH_2$ to provide a polymer having the formula (IV):

$$-(CH_2-C_R)_m-(CH_2-C_{R'})_n- \quad (IV)$$

with $C(=O)OR_1$ and $C(=O)O^- N^+H_3 R_2$ and then (c) imidifying said polymer (IV) to convert same into said (meth)acrylic/glutarimide copolymer of formula (I).

3. The process as defined by claim 2, comprising polymerizing (a) at a temperature ranging from 30° to 140° C. for from 1 to 20 hours, until attaining a degree of polymerization of at least 90%, salifying (b) at a temperature ranging from 0° to 40° C. for from 1 minute to 1 hour, and imidifying (c) at a temperature ranging from 150° to 350° C. for from 1 minute to 5 hours, under a pressure ranging from 1 to 100 atmospheres.

4. The process as defined by claim 3, wherein stage (a) is carried out under atmospheric pressure.

5. The process as defined by claim 3, wherein stage (a) is carried out at a temperature of from 30° to 70° C. for from 1 to 10 hours.

6. The process as defined by claim 3, wherein stage (a) is carried out in the presence of a radical polymerization initiator.

7. The process as defined by claim 6, wherein stage (a) is carried out in the presence of a chain terminator.

8. The process as defined by claim 3, wherein the ratio m/n in stage (a) is such that $\frac{1}{2} \leq m/n \leq 5$.

9. The process as defined by claim 3, wherein stage (b) is carried out under atmospheric pressure.

10. The process as defined by claim 3, wherein stage (b) is carried out at a temperature of from 10° to 30° C. for from 15 to 30 minutes.

11. The process as defined by claim 3, wherein the molar ratio of primary amine/acid groups of the polymer in stage (b) ranges from 1 to 4.

12. The process as defined by claim 3, wherein stage (c) is carried out at a temperature of from 150° to 300° C. for from 5 minutes to 5 hours.

13. The process as defined by claim 3, wherein said stages (a), (b) and (c) are carried out in a solvent medium.

14. The process as defined by claim 3, wherein said stages (a) and (b) are carried out in a solvent medium and further comprising evaporating said solvent upstream of stage (c).

15. The process as defined by claim 3, wherein stage (c) is carried out in a reactor, an extruder or a static mixer.

16. The process as defined by claim 3, wherein said polymerization (a) is carried out in a precipitating medium.

* * * * *